United States Patent
Yamamura et al.

(10) Patent No.: US 9,581,306 B2
(45) Date of Patent: Feb. 28, 2017

(54) VEHICLE HEADLAMP

(71) Applicant: KOITO MANUFACTURING CO., LTD., Tokyo (JP)

(72) Inventors: Satoshi Yamamura, Shizuoka (JP); Takayuki Yagi, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 47 days.

(21) Appl. No.: 14/497,453

(22) Filed: Sep. 26, 2014

(65) Prior Publication Data

US 2015/0092435 A1   Apr. 2, 2015

(30) Foreign Application Priority Data

Oct. 2, 2013   (JP) ................. 2013-207163

(51) Int. Cl.
| | |
|---|---|
| F21S 8/10 | (2006.01) |
| B60Q 1/00 | (2006.01) |
| B60Q 1/08 | (2006.01) |

(52) U.S. Cl.
CPC ........ *F21S 48/1757* (2013.01); *B60Q 1/0005* (2013.01); *B60Q 1/085* (2013.01); *F21S 48/1388* (2013.01); *F21S 48/30* (2013.01); *F21S 48/31* (2013.01); *B60Q 2300/122* (2013.01); *B60Q 2300/32* (2013.01)

(58) Field of Classification Search
CPC ........................... F21S 48/171; F21S 48/1757
See application file for complete search history.

(56) References Cited

U.S. PATENT DOCUMENTS

| 5,938,319 A | 8/1999 | Hege |
| 6,190,029 B1* | 2/2001 | Taniuchi ............ F21S 48/1352 362/277 |
| 8,602,618 B2 | 12/2013 | Ahn et al. |

FOREIGN PATENT DOCUMENTS

| CN | 102478190 A | 5/2012 |
| JP | 09-104288 A | 4/1997 |

OTHER PUBLICATIONS

Communication dated Jun. 30, 2016, from the State Intellectual Property Office of People's Republic of China in counterpart Application No. 201410514941.7.

* cited by examiner

*Primary Examiner* — Nimeshkumar Patel
*Assistant Examiner* — Jacob R Stern
(74) *Attorney, Agent, or Firm* — Sughrue Mion, PLLC

(57) ABSTRACT

A vehicle headlamp includes a light source, a projection optical member, a light deflector, and a tube shaped housing. The projection optical member projects light, which is incident on the projection optical member, ahead. The light deflector includes a plurality of optical devices that are arrayed. The optical devices are individually switchable between a first state and a second state. In the first state, the optical devices reflect light emitted from the light source to a direction other than a direction towards the projection optical member. In the second state, the optical devices reflect the emitted light towards the projection optical member. The light deflector is disposed inside the housing. The projection optical member is disposed in an opening portion of the housing. A first portion, of the housing, intersecting a path of a light beam incident on the light deflector is transparent.

6 Claims, 2 Drawing Sheets

VEHICLE HEADLAMP

CROSS REFERENCE TO RELATED APPLICATION(S)

This application is based on and claims priority under 35 U.S.C. §119 to Japanese Patent Application No.2013-207163 (filed on Oct. 2, 2013), the entire contents of which are incorporated herein by reference.

BACKGROUND

Field

Exemplary embodiments relate to a vehicle headlamp that employs a light deflector.

Related Art

One light deflector is provided with the large number of micro-mirror devices each of which is tiltable. Tilt angles of the micro-mirror devices are digitally switched between a first tilt angle and a second tilt angle, so that a reflection direction of light from a light source can be changed appropriately between a first reflection direction (that is, the micro-mirror devices are turned ON) and a second reflection direction (that is, the micro-mirror devices are turned OFF).

JP H09-104288 A (corresponding to U.S. Pat. No. 5,938, 319) describes a vehicle lighting device including a reflective light deflector that is disposed on a light path of reflected light from at least one light source. The light deflector can reflect light that hits the light deflector so as to form light flux that are emitted from the lighting device.

SUMMARY

In a lamp unit that uses a light deflector such as one described above, the light deflector and the light source, such as a light-emitting diode, are disposed in the same housing. In this configuration, air convection due to heat generated by the light source tends to occur near a surface of the light deflector. Dust and volatile substances, etc. carried by the air may adhere to the surface of the light deflector, which results in contamination of the surface of the light deflector. As a result, a light intensity may be decreased and/or a shadow may be formed in the light distribution pattern.

In view of the above circumstances, the invention has been made. Exemplary embodiments provide technology that prevents or reduces contamination of a surface of a light deflector inside a vehicle headlamp.

According to an aspect of the invention, a vehicle headlamp includes a light source, a projection optical member, a light deflector, and a tube shaped housing. The projection optical member projects light, which is incident on the projection optical member, ahead. The light deflector includes a plurality of optical devices that are arrayed. The optical devices are individually switchable between a first state and a second state. In the first state, the optical devices reflect light emitted from the light source to a direction other than a direction towards the projection optical member. In the second state, the optical devices reflect the emitted light towards the projection optical member. The light deflector is disposed inside the housing. The projection optical member is disposed in an opening portion of the housing. A first portion, of the housing, intersecting a path of a light beam incident on the light deflector is transparent.

With this configuration, since the housing isolates the light deflector from the light source which is a heat generation source, air convection near the surface of the light deflector is prevented. As a result, contamination of the surface of the light deflector due to adhesion of dust or volatile substances thereto can be prevented and/or reduced.

Exemplary embodiment of the invention can prevent or reduce contamination of a surface of a light deflector inside a vehicle headlamp.

DETAILED DESCRIPTION

Figure 1:
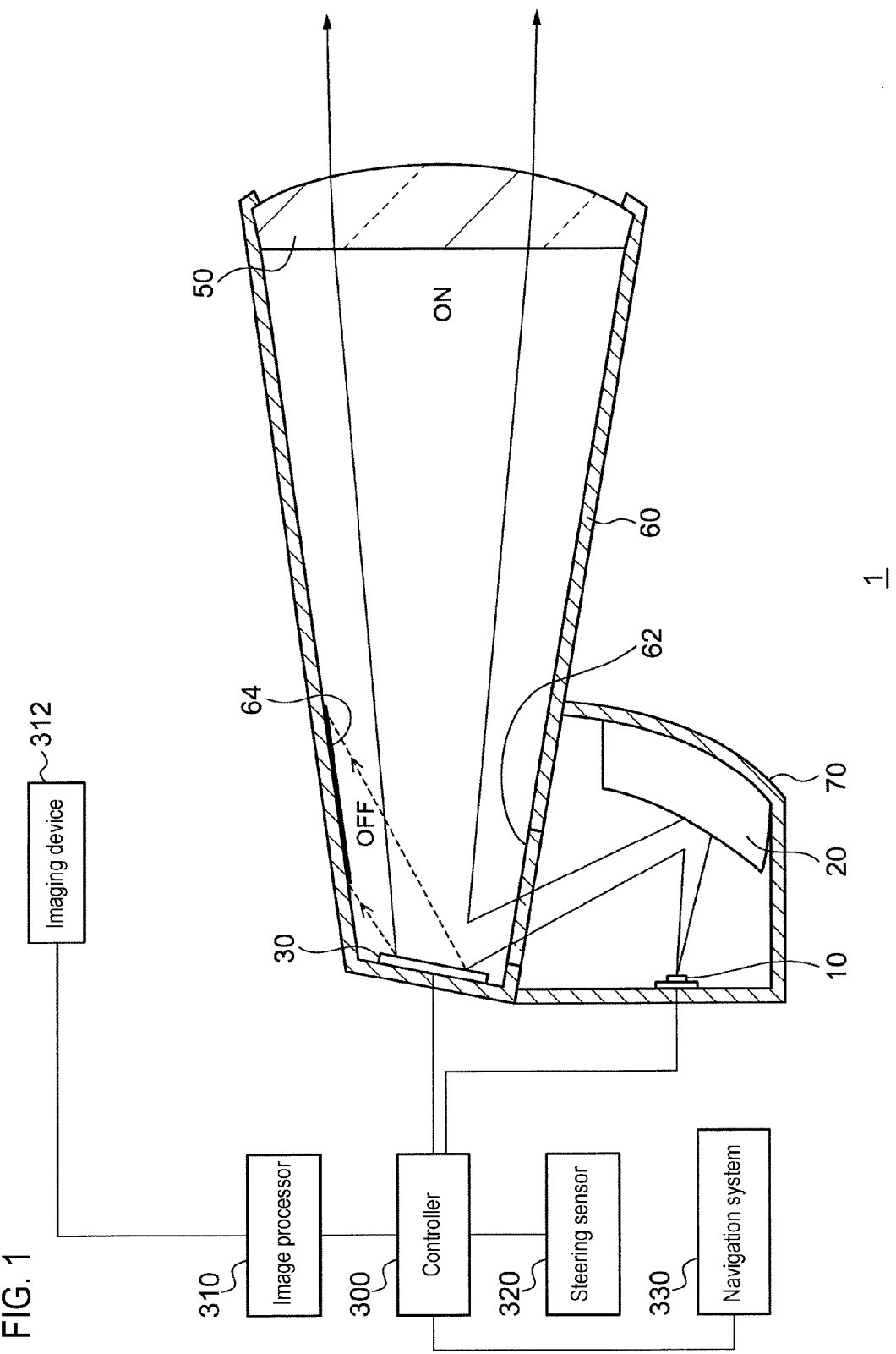
FIG. 1 is a vertical sectional view illustrating the schematic structure of a vehicle headlamp according to one exemplary embodiment of the invention.

FIG. 1 is a vertical sectional view illustrating the schematic structure of a vehicle headlamp 1 according to an exemplary embodiment of the invention. The vehicle headlamp 1 is disposed on each of the left and right sides at a front portion of a vehicle. It is noted that the left and right headlamps have substantially the same configuration except that a portion of components thereof have symmetrical structure relationship therebetween in the right and left directions.

The vehicle headlamp 1 includes a first housing 60 having a substantially cylindrical shape and formed with an opening portion on a vehicle front side thereof. A projection optical member 50 is attached to the opening portion of the first housing 60.

A light source 10 may be any of a semiconductor light emitting device, such as an LED (Light Emitting Diode), an LD (Laser Diode), or an EL (Electroluminescence) device, a light bulb, an incandescent lamp (a halogen lamp), an electric-discharge lamp (a discharge lamp), and the like.

A reflective optical member 20 is configured so as to guide light emitted from the light source 10 to a reflection surface of a light deflector 30. Examples of the reflective optical member 20 include a solid light guiding body and a reflection mirror having an inner surface which serves as a predetermined reflection surface. In a case where the light emitted from the light source 10 can be directly guided to the reflection surface of the light deflector 30, the reflective optical member 20 need not be provided.

The light source 10 and the reflective optical member 20 are housed inside a second housing 70. The second housing 70 is attached to a lower portion of the first housing 60.

The light deflector 30 is disposed on an optical axis of the projection optical member 50. The light deflector 30 is configured so as to selectively reflect the light emitted from the light source 10 to the projection optical member 50. The light deflector 30 is, for example, a MEMS (Micro Electro Mechanical System) in which plural micro-mirror devices are arranged in an array (matrix) manner.

Figure 2:
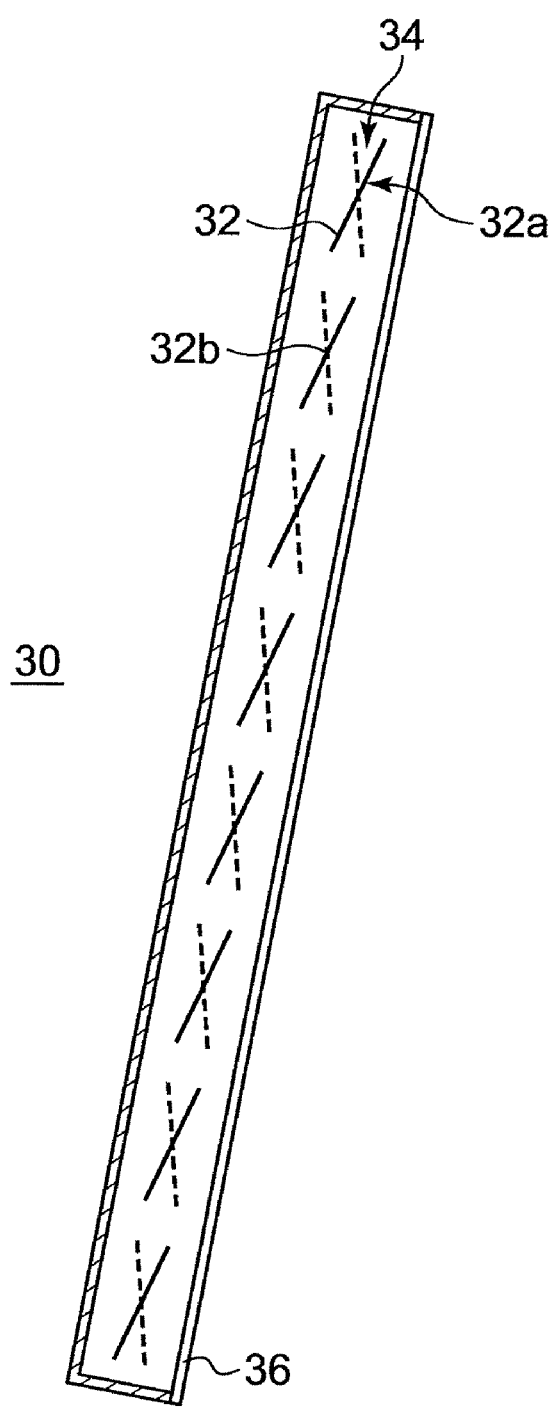
FIG. 2 is a schematic sectional view of a light deflector.

FIG. 2 is a schematic sectional view of the light deflector 30. The light deflector 30 includes a micro-mirror array 34 and a transparent cover member 36. In the micro-mirror array 34, plural micro-mirror devices 32 are arranged in the matrix shape. The transparent cover member 36 is disposed on a front side (right side in FIG. 2) of reflection surfaces 32a of the micro-mirror devices 32. Each micro-mirror device 32 has a substantially square shape. Each micro-mirror device 32 includes a pivot shaft 32b that extends in a horizontal direction and substantially bisects the micro-mirror device 32.

The micro-mirror devices 32 of the light deflector 30 are configured so as to be able to individually switch between a first state (OFF state; represented by dotted lines in FIG. 2) and a second state (ON state; represented by solid lines in FIG. 2). When the micro-mirror device 32 is in the first state (OFF state), the light emitted from the light source 10 is reflected to a direction other than a direction towards the projection optical member 50. When the micro-mirror device 32 is in the second state (ON state), the light emitted from the light source 10 is reflected toward the projection optical member 50.

FIG. 1 shows (i) light reflected by the light deflector 30 when the micro-mirror devices 32 of the light deflector 30 are in the first state (OFF state; represented by dotted lines in FIG. 1) and (ii) light reflected by the light deflector 30 when the micro-mirror devices 32 of the light deflector 30 are in the second state (ON state; represented by solid lines in FIG. 1). As described above, The light deflector 30 can selectively change a light reflection direction.

The projection optical member 50 is formed, for example, of a free-form surface lens having a front side surface and a rear side surface which are formed in free-form surface shapes. The projection optical member 50 projects a light source image, which is formed on a rear focal plane including a rear focal point of the projection optical member 50, onto a virtual vertical screen ahead of the lamp unit as an inverted image. The projection optical member 50 is disposed so that the rear focal point of the projection optical member 50 is positioned on the optical axis of the vehicle headlamp 1 and near the reflection surfaces of the micro-mirror array 34 of the light deflector 30.

A controller 300 adjusts an emission intensity of the light source 10 and executes ON/OFF control for each of the micro-mirror device 32 of the light deflector 30. The hardware configuration of the controller 300 may be implemented by elements and circuits such as a computer CPU and memory. The software configuration of the controller may be implemented by a computer program. The controller 300 receives information, including vehicle speed information and vehicle attitude information, from an image processor 310, a steering sensor 320, a navigation system 330, a light switch (not shown), a vehicle speed sensor (not shown), and an acceleration sensor (not shown), and the like. The image processor 310 is connected to an imaging device 312. The controller 300 transmits various control signals to the light source 10 and the light deflector 30 in accordance with the received information.

In the first housing 60, at least a portion 62 is transparent. The transparent portion 62 of the first housing 60 intersects a light beam incident on the light reflector 30 from the reflective optical member 20. The transparent intersecting portion 62 may be formed by fitting a transparent member such as glass or resin into an opening portion which is formed in the first housing 60 in advance. Alternatively, the transparent intersecting portion 62 may be produced by a known two-color molding process. Furthermore, it is preferable that an anti-reflective process, such as an AR coating, be applied to the intersecting portion 62.

In the first housing, a portion 64 is opaque and is applied with a non-reflective coating. Light reflected by the light deflector 30 hits the opaque portion 64 of the first housing 60 when the micro-mirror devices 32 of the light deflector 30 are in the first state (OFF state). This configuration is employed in order to prevent light from being reflected by the portion 64 and projecting ahead of the lamp unit when the micro-mirror devices 32 are in the first state (OFF state). However, in reality, there is a case where light leaks to portions other than the opaque portion 64. Therefore, it is preferable that the entire first housing 60, excluding the intersecting portion 62, be opaque and that non-reflective coating be applied to the inner surfaces of the first housing 60.

As described above, the first housing 60 isolates the light deflector 30 in another space from the light source 10 serving as a heat generation source. Therefore, air convection caused by heat generated by the light source 10 does not move air inside the first housing 60, which houses the light deflector 30 therein. As a result, it can be prevented or reduced that the surface of the transparent cover member 36 of the light deflector 30 is contaminated due to adhesion of dust and/or volatile substances such as adhesive. Thus, it can be prevented that a light intensity of the vehicle headlamp is decreased and that a shadow is formed in the light distribution pattern. Furthermore, when a desiccant agent or the like is provided in the first housing 60 so that the first housing 60 is dehumidified, it can be prevented that condensation is formed on the surface of the transparent cover member 36.

It may be considered as a way to prevent contamination of the light deflector 30 that only a periphery of a light deflector is covered with a transparent cover. However, in such a configuration, a light beam passes the transparent cover twice; when the light beam is incident and when the light beam is emitted. Thus, loss of light fluxes would be large. To the contrary, according to the exemplary embodiment, a light beam passes the transparent portion once.

The projection optical member 50 and the first housing 60 may be integrally formed. The configuration enhances the airtightness of the first housing 60, so that it can be more reliably prevented that contaminants enter the first housing 60 from outside. The first housing 60 may be formed with an opening portion, for example, between the transparent intersecting portion 62 and the projection optical member 50.

The exemplary embodiments of the invention are explained above. However, the invention is not limited thereto. Appropriate combinations of the configurations of the exemplary embodiments and ones obtained by substituting a part of the configurations of the exemplary embodiments for other elements are also included in the invention. Moreover, (i) modifications to respective combinations in the exemplary embodiment, (ii) appropriate changes to the sequence of processes in the exemplary embodiments, (iii) various design modifications in the exemplary embodiments, and the like may be based on knowledge of one skilled in the art. Embodiments obtained by such modifications may also be included in the scope of the invention.

What is claimed is:
1. A vehicle headlamp comprising:
a light source;
a projection optical member that projects light, which is incident on the projection optical member, ahead;
a light deflector including a plurality of reflective optical devices that are arrayed, wherein
each of the plurality of optical devices are individually switchable between a first state and a second state by selectively changing a reflection direction of light incident on the plurality of optical devices,
in the first state, the plurality of optical devices reflect light emitted from the light source to a direction other than a direction towards the projection optical member,
in the second state, the plurality of optical devices reflect the emitted light towards the projection optical member; and
a tube shaped housing, wherein
the light deflector is disposed inside the housing, the projection optical member is disposed in an opening portion of the housing, a first portion of the housing, intersecting a path of a light beam incident on the light deflector, is transparent, and the housing seals the light deflector in a space separate from the light source, wherein the light source is a heat generation source.

2. The vehicle headlamp according to claim 1, wherein a second portion of the housing which is hit by light reflected by the light deflector when the light deflector is in the first state is coated by a non-reflective coating.

3. The vehicle headlamp according to claim 2, wherein the housing, excluding the first portion, is coated by a non-reflective coating.

4. The vehicle headlamp according claim 1, wherein the projection optical member and the housing are integrally formed.

5. The vehicle headlamp according claim 2, wherein the projection optical member and the housing are integrally formed.

6. The vehicle headlamp according claim 3, wherein the projection optical member and the housing are integrally formed.

* * * * *